United States Patent Office 2,917,466
Patented Dec. 15, 1959

2,917,466
PLATINUM METAL CATALYSTS

Miroslav W. Tamele, Oakland, and Kenzie Nozaki, El Cerrito, Calif., assignors to Shell Development Company, Emeryville, Calif., a corporation of Delaware No Drawing. Application December 11, 1951
Serial No. 261,148

9 Claims. (Cl. 252—455)

This invention relates to a method for the production of improved platinum metal catalysts and to the improved catalysts so produced.

BACKGROUND

The platinum metals, i.e., platinum, palladium, iridium, osmium, rhodium, and ruthenium, have pronounced and characteristic catalytic activity. They may be applied as is, but they are generally applied on the surfaces of various supports or carrier materials such as activated carbon, coke, charcoal, asbestos, pumice, or the like. The support or carrier material is usually inert catalytically and simply provides a means for spreading the costly platinum metal over a large surface. The character of such supported catalysts is primarily monofunctional, i.e., the activity of the catalyst is characteristically that of the platinum metal. The catalytic properties of these metals are similar although not necessarily equivalent. Such catalysts, provided that they contain enough of the platinum metal, are quite active for hydrogenation-dehydrogenation reactions and certain oxidation reactions, but they are quite costly, easily poisoned, and have no appreciable ability to catalyze reactions involving different catalytic mechanisms.

In contrast to the usual supported platinum metal catalysts, catalysts which are much superior for certain types of conversions are obtained if the platinum metal is applied on the surface of a support material which is of itself an active cracking catalyst. The catalysts prepared in this manner exhibit multifunctional characteristics; also, the properties of the platinum metal are enhanced by a synergistic effect and this allows quite active catalysts to be prepared with lower concentrations of the costly platinum metal. Certain catalysts of this type are known. Thus, for example, U.S. Patents Nos. 2,478,916; 2,479,-109; 2,479,110; 2,550,531; and 2,566,521 describe the preparation and use of platinum and palladium catalysts prepared with a clay-type cracking catalyst. In addition to the treated clay cracking catalyst, the following synthetic cracking catalysts are specifically mentioned; silica-alumina; silica-zirconia; silica-alumina-zirconia; silica-magnesia; silica-alumina-magnesia; silica-alumina-thoria; alumina boria. The catalysts may be made in any of the known conventional manners including separate, successive, and co-precipitation methods of manufacture.

The cited patents indicate that the cracking catalyst should be dried at a temperature of at least 350° F. and preferably calcined at a higher temperature before the platinum is composited therewith. This is peculiar to catalysts using a clay-type cracking catalyst as a carrier; the effect does not exist when using inert supports.

The usual and preferred method for compounding the platinum with the clay-type cracking catalyst is to impregnate the previously dried and calcined cracking catalyst with the desired amount of a solution of chloroplatinic acid. An alternative method is to prepare a solution of chloroplatinic acid and saturate the same with hydrogen sulfide; the resulting colloidal solution of platinum sulfide is then utilized to impregnate the cracking catalyst. The impregnated cracking catalyst is finally dried and treated with hydrogen to reduce the platinum to the metallic state.

When preparing the catalysts in these manners, the amount of platinum incorporated may be varied over a wide range to suit any particular condition. However, for general use a concentration of platinum of at least 0.3% is required in the finished catalyst to produce a practical catalyst.

THE INVENTION

It is now found that improved multifunctional platinum metal catalysts may be prepared if a platinum metal is incorporated with a clay-type cracking catalyst by the method hereinafter described. Catalysts prepared by this method owe their superiority to a better cooperation, so to speak, between the characteristic activity of the platinum metal and the totally different characteristic activity of the clay-type cracking catalyst, whereby the synergistic effect is enhanced. Consequently, more selective and more active catalysts can be produced and any given degree of activity can be obtained with a lesser amount of the costly platinum metal. Broadly stated, the steps of the present method are as follows:

(1) A neutralized clay-type cracking catalyst is first prepared. It is neutralized or alkalized with an alkaline compound which can be subsequently removed substantially completely from the composite.

(2) The neutral clay-type cracking catalyst (which due to neutralization is substantially devoid of cracking activity) is impregnated with the platinum metal through use of a suitable solution having the characteristics described in a subsequent paragraph.

(3) The composite is then dried and treated to remove the mentioned alkaline compound and restore its acidic nature. The catalyst may be subjected to conventional reduction treatment to convert the metal to the metallic state and it can also, if desired, be partially sulfided by treatment with any of the conventional sulfiding gases.

Step I.—Neutralization of the cracking catalyst

Any of the clay-type cracking catalysts may be used. The various known clay-type cracking catalysts all exhibit similar catalytic activity and essentially similar physical properties but they are not necessarily equivalent in the present composite catalysts. As will be explained, it is desired to obtain a certain balance between the two types of characteristic activities. Thus, while it is desired that both types of activity be present, it is generally not desired that the cracking activity should predominate overwhelmingly. Generally clay-type cracking catalysts having a large available surface and high activity are chosen in those cases where a relatively large amount of the platinum metal is to be applied e.g., 1% or where a particularly active platinum metal, e.g., rhodium, is employed, and clay-type cracking catalysts of somewhat lesser activity are chosen in the other cases. However, the present method allows excellent catalysts having a good balance to be obtained also in the case of very active clay-type cracking catalyst composited with small concentrations of the platinum metal.

The clay-type cracking catalyst is preferably in the xerogel state, i.e., it is dried sufficiently to afford the usual microporous structure affording an appreciable available surface. It is also desirable in some cases, but not essential, to calcine the catalyst or steam it under drastic conditions to reduce its available surface somewhat as described in U.S. Patent No. 2,550,531 but it is generally not necessary to reduce the available surface to the drastic extent indicated in this patent. On the other hand, it is also possible to use rigid cracking catalysts which have been merely dried at a low temperature and still contain considerable amounts of water.

As will be explained in a later paragraph, a characteristic property of the clay-type cracking catalysts is their high acidity. In the method of the invention, the platinum metal is composited with a clay-type cracking catalyst while the latter is in a neutralized or alkaline condition. In this non-acidic condition it does not exhibit any appreciable cracking activity. In order to obtain the neutralized clay-type cracking catalyst the acid catalyst may be treated with any suitable alkaline material which may be subsequently removed substantially completely to restore the cracking activity. On the other hand, it is possible to obtain the neutralized catalyst from an intermediate step in the usual preparation of the acid cracking catalysts. For example, the conventional silica-alumina cracking catalysts are prepared by reaction of sodium silicate with an acid and an aluminum salt to form a hydrogel. If this reaction is carried out under highly acid conditions, the acid hydrogel results. The acid hydrogel can be alkalized prior to drying it. On the other hand, the hydrogel is also commonly formed under neutral, alkaline or slightly acid conditions in which case the sodium salt of the acid hydrogel is formed. In order to produce the acid catalyst, it is then necessary to remove the sodium by treating the material with an acid or an acid salt such as aluminum nitrate. The sodium can also be removed by washing with an ammonium salt after which the ammonium salt is decomposed by calcination to give the desired acid catalyst. The neutral or alkaline material at these intermediate stages prior to acidification by acid treating or calcination of the ammonium salt can be utilized as the base in the present process. The preferred neutralization agents are the non-metallic bases which may be subsequently removed by calcining the catalyst at a temperature which is otherwise not detrimental to the catalyst, e.g., below 1200° F. It is preferred to employ a base which can be easily removed substantially completely by simply heating the catalyst while passing a small steam flushing gas or while subjecting to partial vacuum. The various volatile nitrogen bases and particularly those that are water-soluble, such as ammonia, the lower amine and the like, are suitable.

While the organic bases which can be removed by calcination are preferred in nearly every case, there are cases where ordinary water-soluble alkaline inorganic compounds such as the alkali metal and alkaline earth metal hydroxides, carbonates, bi-carbonates, and the like can be used and are, in fact, preferred. A particular instance is where a very small amount of a platinum metal is to be incorporated with a clay-type cracking catalyst having a very large available surface and a very high cracking activity. When applying the inorganic bases, it is recommended to choose one of the known bases that can be substantially completely removed from the composite catalyst by a simple treatment which will not remove the platinum metal component. For example, after the platinum metal is reduced to the metallic state, the catalyst can be treated with dilute acid to remove the alkaline compound substantially completely. In the special case just mentioned, it is desirable to remove only a portion of the alkali. The alkali which then remains acts to partially poison the excessive cracking activity of the overactive support. In this case, the alkaline earth metal compounds are preferred to the alkali metal compounds.

While the clay-type cracking catalysts are strongly acid, only a relatively small amount of alkali is required to neutralize them. In general, therefore, the cracking catalyst is completely neutralized upon contact with the alkaline neutralization agent. An excess of the neutralization agent does no particular harm but is not necessary. Thus, the neutralized cracking catalyst may be washed with water to remove excess alkali. The alkali used in neutralizing the acid in the catalyst is tenaceously held and is not removed by washing with water.

It should be noted that the purpose of the described treatment is to neutralize the acidity inherent in the clay-type cracking catalyst and not to pre-impregnate the carrier with a precipitant for the metal subsequently to be incorporated, for, as will be seen, the metals subsequently applied are not precipitated from their solution by alkali and such precipitation, if it did occur, would be highly undesirable.

*Step II.—Impregnation of the neutralized cracking catalyst*

The impregnation of the neutral clay-type cracking catalyst is effected with a suitable solution of the desired platinum metal or mixture of such metals in any of the conventional ways. One suitable method is to prepare a dilute solution of the desired platinum metal and soak the neutralized cracking catalyst in an excess of the solution for several hours or until the desired concentration of the platinum metal is incorporated. There are, however, certain requirements for the impregnation which are not customary. The solution applied must not be appreciably acid, for, it it is acid, the effects of the neutralization of the cracking catalyst are lost. For this reason, the usual solution of chloroplatinic acid and the platinum sulfide sols prepared by saturating a chloroplatinic acid solution with hydrogen sulfide are not suitable. These solutions are quite acid. In the process of the invention it is desired to use an approximately neutral solution or one having a pH at least above about 3.5. Such solutions can be prepared by dissolving known complex compounds of the platinum metals. By way of example, aqueous solutions of the following compounds are suitable:

$[Pt(NH_3)_4]Cl_2$    $[Rh(NH_3)_6]Cl_2$
$[Pt(NH_3)_4](OH)_2$  $[OsO_2(NH_3)_2]Cl_2$
$[Ru(NH_3)_4]Cl_2$    $[Ir(NH_3)_4]Cl_2$
$[Pt(NH_3)_4](NO_3)_2$ $[Ir(NH_3)_6]Cl_3$
$[Pd(NH_3)_4]Cl_2$

It is preferred that the metal exists in the cation of the compound as in the compounds listed above.

After combining the neutralized cracking catalyst with the solution of the platinum metal, the composite may be dried and calcined. If desired, the composite can be washed with water to remove that portion of the metal compound which is simply held in bulk in the catalyst rather than absorbed on the catalytic surface. While this washing is recommended, it is not essential to the preparation of an active catalyst. Such washing, if applied, should be effected prior to the final reduction of the platinum metal compound to the metallic state.

The concentration of the platinum metal incorporated in the catalyst as described may vary from about 0.01% up to 1% or more. The preferred concentration depends in any case upon the platinum metal used, the cracking catalyst used, and the desired balance of the activities in the composite multifunctional catalyst. When incorporated in the composite in the described manner, platinum affords very active and excellent catalysts at concentrations of the order of 0.05 to 0.3%. Palladium is generally similar to platinum. Rhodium, on the other hand, is very active and is generally applied in a lower concentration. Excellent catalysts may be prepared by impregnating the alkalized cracking catalyst with a suitable solution of the crude mixture of platinum metals such as obtained prior to refining in the production of pure platinum. Such mixture consists largely of platinum but also contains minor amounts of the other platinum metals.

*Step III.—Removal of the neutralization agent*

After the neutralized cracking catalyst has been impregnated with the solution of a suitable compound of the desired platinum metal or mixture of platinum metals the composite may be dried and calcined. The mode of removal of the neutralization agent will depend upon the particular type of alkaline material present as the neutralizing agent. In the case of the volatile compounds, e.g., ammonia and the like, these neutralization agents may be completely removed and the cracking activity of the catalyst completely restored by calcination. A temperature of about 350–550° C. is generally to be recommended but somewhat higher temperature can usually be employed; lower temperatures can also be employed in most cases, especially where the removal of volatile base is hastened by the application of a vacuum or a flushing gas such as air, nitrogen, hydrogen, or the like. In any case, however, the catalyst must be heated to a sufficiently high temperature to cause the volatile neutralizing agent, e.g., ammonia, to leave the acid sites of the catalyst. The step of removing the neutralization agent by volatilization may be effected before, after, or during conversion of the metal compound to the free metal. If desired the calcination can be effected during the reduction or initial use of the reduced or unreduced catalyst.

In those cases where a non-volatile alkali is employed to neutralize the cracking catalyst, it may be removed by leaching with dilute acid, e.g., nitric acid, or an acid salt such as ammonium chloride, ammonium sulfate, aluminum sulfate, aluminum nitrate, or the like, which can be completely removed by subsequent calcination or which, upon subsequent calcination, leaves a minor residue which is not detrimental to the catalyst. In these cases, the reduction of the metal compound to the metal is preferably first carried out in order to minimize leaching of the active metal component. This leaching or extraction is preferably carried out until all extractable alkali is removed. In some cases, however, as indicated above, it may be desirable to purposely leave a controlled portion of the alkali to reduce an excessive cracking tendency by poisoning. Upon removing the alkali from the composite the cracking catalyst support is returned from an inactive state to its acidic and highly active condition.

EXPLANATION

While it is not intended that the present invention should be limited by the correctness of any explanation as to the reason for the improved results, it is believed that the invention will be more easily understandable if the features underlying the method are explained. The following explanation is, therefore, given only to aid in understanding the reasons for the various manipulations and limitations given above.

It has been known for some time that certain acid treated clays are effective in catalyzing the cracking of hydrocarbons when applied at a cracking temperature under suitable conditions and that the reaction mechanism differs fundamentally from that which takes place in thermal cracking. In addition to the treated clays, a large number of so-called synthetic cracking catalysts have been found which exhibit the same catalystic properties as the mentioned acid-treated clays. This group of catalyst, including the clays, is often referred to as the clay-type cracking catalysts. This group of catalysts includes a variety of combinations of materials such as silica, alumina, magnesia, zirconia, beryllia, aluminum fluoride, aluminum phosphate, boric oxide, and the like. The most widely used cracking catalyst is, for instance, a synthetic combination of silica and alumina. Recent studies have conclusively shown that these clay-type cracking catalysts are all acidic and that it is the acidic centers in their surfaces that are responsible for their observed catalytic characteristics. It has been shown that the acidic centers in these catalysts are produced in the surface of the catalyst by certain combinations or interactions of the constituents. They are, therefore, part of and caused by the atomic structure at localized sites on the surface. Since the acidity is part of the solid surface, it is not extractable by aqueous solutions as are ordinarily water-soluble acids. The active centers may, however, be titrated in an anhydrous medium; also their acid strength can be measured. It has been found that these active centers occupy a very small part of the surface of the catalyst, estimated to be about 2% or less.

Physically, the clay-type cracking catalysts have a microporous structure affording an extensive available surface. The available surfaces in the fresh catalysts are nearly always above about 200 square meters per gram as measured by the low temperature nitrogen adsorption method (B.E.T. method), and are usually between about 400 and 600 square meters per gram. They are capable of withstanding temperatures of at least 1000° F. without appreciable sintering.

It can easily be shown by a simple calculation that when a small amount of a catalytic agent such as a platinum metal, e.g., 0.3% platinum, is applied to the surface of a clay-type cracking catalyst, it would be incapable of covering more than a very small fraction of the surface even if spread out as a mono-molecular film. The platinum metals, it is found, are present on the surface of the catalyst in small clusters or aggregates of crystallites. The metal, therefore, covers or contacts only a small part of the surface of the cracking catalyst.

As previously pointed out, the active sites in the cracking catalyst likewise occupy only a small part of the catalyst surface. The synergistic effect noted in catalysts of the described general type is due to co-action between these two distinct types of catalytic centers and this requires a certain spacial relationship between them. If the two types of active centers are widely separated, as, for instance, is the case when a cracking catalyst is physically admixed with a platinum catalyst prepared with a non-cracking support, the synergistic effect is lost and the catalytic effect is simply the sum of the effects of the two catalysts, each of which acts by itself in its individual way. This is illustrated by the following.

Three comparable granular catalysts (16–28 mesh) were prepared as follows:

Catalyst A: An aluminum fluoride-alumina cracking catalyst.
Catalyst B: A platinum-alumina catalyst prepared by impregnation with the same alumina as catalyst A and containing 0.27% Pt.
Catalyst C: A multifunctional catalyst prepared by incorporating 0.27% Pt in catalyst A by impregnation.

These catalysts were tested under standardized test conditions for the isomerization of normal butane, and also under a different set of standardized test conditions for the dehydrogenation of normal butane. In addition, granules of catalyst A and catalyst B were mixed in equal proportions and a standard test charge of the mixture was tested for comparison. The result expressed in terms of comparative isomerization rates and dehydrogenation rates, are shown in the following table:

| Catalyst | Isomerization Rate | Dehydrogenation Rate |
| --- | --- | --- |
| A—Aluminum fluoride—alumina | 0.4 | 0.2 |
| B—0.27% Pt—alumina | 0.1 | 3.6 |
| C—0.27% Pt—Catalyst A | 7.8 | 40.0 |
| Mixed granules of Catalyst A+Catalyst B | 0.0 | 3.5 |

It is seen that neither catalyst A or catalyst B was appreciably active for either isomerization or dehydrogenation under these test conditions. Likewise the combination of the platinum catalyst with the cracking catalyst had no appreciable activity when the granulates were simply mixed. On the other hand, the synergistic effect obtained when the platinum was incorporated on the surface of the cracking catalyst is clearly evident.

In preparing a catalyst in which platinum was incorporated by impregnation into a bori-alumina cracking catalyst, three alternative methods were employed, as follows:

Catalyst A was prepared in the usual way by impregnating a dried boria-alumina cracking catalyst with 0.2% Pt.

Catalyst B was prepared by impregnating the same alumina base with 1.2% Pt and then incorporating the same amount of boric oxide.

Catalyst C was prepared by incorporating the same amount of platinum and boric oxide simultaneously.

The resulting catalysts which were all prepared with the same alumina base and had the same chemical composition were tested for the isomerization of butane and the dehydrogenation of butane under standardized test conditions. The results in terms of comparative rates are shown in the following table:

| Catalyst | Isomerization Rate | Dehydrogenation Rate |
| --- | --- | --- |
| A—Pt incorporated last | 0.0 | 16 |
| B—$B_2O_3$ incorporated last | 1.7 | 49 |
| C—Pt and $B_2O_3$ incorporated together | 8.8 | 166 |

The relatively poor activity of the normal catalyst (catalyst A) under these test conditions can be explained by the relatively poor spacial relationship between the active cracking centers and the dehydrogenation-hydrogenation centers of the platinum. When the platinum was fixed first and the boric oxide was subsequently incorporated an improvement was obtained but it was slight. When, however, the two materials were simultaneously incorporated, a much more intimate relationship was obtained and the desired synergism was much improved.

In the multifunctional catalysts prepared by the usual impregnation methods, the synergistic effect is obtained only to a limited extent which is due to random association of the two types of active centers each of which occupies only a small area in a large field. It is possible that when impregnating the acid cracking catalyst with an acid solution, approach of the two types of active centers to afford the synergistic effect is actually hindered, but whether this is so or not is immaterial. When the strongly positive acid surface of the cracking catalyst is neutralized, the platinum metal is caused to deposit in a more favorable spacial relationship with respect to the potential cracking centers. It is also possible that part of the effect is due to the alkaline or non-acid surface of the cracking catalyst causing the platinum metal to deposit in crystallites of more nearly optimum size. That an optimum crystallite size exists in the case of platinum supported on inert carriers, and that the crystallite size is affected by the nature of the support has been shown by A. Rubinshtein, Comptes Rendus of the Academy of Sciences, U.S.S.R., vol. 23, No. 1, page 57, 1939.

The following example illustrates one suitable method for preparing a catalyst according to the invention.

A silica-alumina composite cracking catalyst was prepared as follows: A chilled 4.61 N aqueous sodium meta silicate solution was added with stirring to a chilled solution 2.3 N in hydrochloric acid and 0.3 M in aluminum chloride. The silica concentration of the resulting sol was about 46 grams per liter. The sol was allowed to set to a hydrogel and the hydrogel was aged for seven days at room temperature. The aged silica-alumina hydrogel was slurried with water, washed until the wash water was virtually free of chloride ions, and then filtered and dried at 120° C.

The resulting xerogel was a neutral cracking catalyst in which the acid sites were neutralized by alkali from the sodium silicate. In order to produce a finished cracking catalyst from this xerogel, it would be necessary to remove the alkali by treating the xerogel with an acid or an acid salt.

The neutralized xerogel was treated with a solution of 2 N ammonium nitrate until the sodium was substantially completely removed. The material was then thoroughly washed with water and finally dried at room temperature. The resulting xerogel was a neutral cracking catalyst in which the acid sites were neutralized by ammonia. The ammonia concentration was 0.20–0.25% $NH_4^+$, calculated on the anhydrous basis. If this catalyst had been calcined after drying, the ammonia would have been driven off, thus freeing the acid sites and rendering the material active for cracking.

The neutral air dried xerogel was soaked in an excess of a substantially neutral solution of tetrammine platinous chloride, $Pt(NH_3)_4Cl_2$, containing 0.14% Pt, and was then soaked for about three days in a further quantity of substantially neutral tetrammine platinous chloride solution containing 0.35% Pt. The tetrammine platinous chloride solution was prepared as described in copending application, Serial No. 242,788, filed August 20, 1951, now abandoned. The xerogel was then washed 15 times with water until the wash water gave only a faint test for chloride ion, and then dried at 120° C. The resulting catalyst contained 0.19% Pt and 0.24% $NH_4^+$, calculated on the anhydrous basis.

The catalyst prepared as described was heated at 475° C. to drive out the ammonia and restore the acidity. After reducing the platinum to the metallic state with hydrogen, the catalyst was tested for the conversion of methylcyclopentane under the following test conditions:

Temperature _____ ° C__ 475
Pressure _____ lbs./sq. in__ 300
Liquid hourly space velocity _____ 16.6
Hydrogen to hydrocarbon mole ratio _____ 5:1

The conversion efficiency, which is defined as 100 times the amount of methylcyclopentane converted to benzene by dehydroisomerization divided by the amount of methylcyclopentane reacted to all products and is, therefore, a measure of the selectivity of the catalyst, was 77.4. The conversion efficiency of a standard halogen-containing platinum-alumina catalyst was 59% under the same test conditions. The activity of the described catalyst was 2.8 times that of the standard catalyst.

As stated above, it is important that in incorporating the platinum a solution be used which is not sufficiently acid to react with and remove the protecting alkali from the acid sites of the cracking catalyst. Thus, for comparison, a second catalyst was prepared from the same neutral cracking catalyst base described above, but instead of applying the substantially neutral tetrammine platinous chloride solution to incorporate the platinum, the base was treated with chloro platinic acid to incorporate 0.2% platinum. This acid solution immediately removed the protecting ammonium ions. After pretreating the catalyst in the same manner, it was tested under the same conditions. The conversion efficiency was only 65%. The activity on the same basis was 2.5.

While the invention is primarily directed to the preparation of multifunctional platinum metal catalysts, the method just described can also be used in the preparation of catalysts in which copper, silver, titanium, thorium, vanadium, chromium, molybdenum, tungsten, manganese, rhenium, cobalt and nickel are used in place of, or in conjunction with, the platinum metal. Generally speaking, the present method has no particular advantage over the usual impregnation methods for preparing supported catalyst containing these metals since fairly high concentrations of these metals are generally employed and at such high concentrations the effects due to the particular method of combining the components are masked. When, however, it is desired to incorporate small amounts of such metals, e.g., less than 2% and preferably less than 1%, with a clay-type cracking catalyst, the described method can be advantageously employed. The only additional requirement in this case is that a soluble compound of the metal be chosen which does not produce a precipitate upon contact with the base used to neutralize the cracking catalyst. If precipitation occurs, the metal is found to deposit in the pores of the catalyst in the form of relatively large clumps or aggregates which do not afford the desired cooperation with the active centers of the cracking catalyst.

We claim as our invention:

1. An acidic supported platinum catalyst containing between about 0.01% and about 1% of platinum deposited in the surface of a solid acidic silica-alumina cracking catalyst, prepared by incorporating the platinum in the surface of the cracking catalyst by soaking the cracking catalyst in a neutralized condition with a substantially neutral solution of tetrammine platinous chloride and then removing the neutralizing agent to restore the normal acid character of the cracking catalyst.

2. The method for preparing a supported platinum catalyst which comprises preparing a substantially neutral aqueous solution of tetrammine platinous chloride, soaking in said solution an acidic cracking catalyst the normal acidity of which is neutralized by a base thereby to impregnate the neutral cracking catalyst with said platinum, drying the soaked neutral cracking catalyst, removing the base by which the acidity of the cracking catalyst was neutralized, and subjecting the resulting acidic catalyst to a reduction treatment to reduce the platinum to the metallic state.

3. The method for the production of a supported acidic platinum catalyst which comprises treating a normally acidic cracking catalyst with a volatilizable nitrogen base to neutralize the acidity of the catalyst, then treating the resulting substantially neutral cracking catalyst with a substantially neutral aqueous solution of tetrammine platinous chloride thereby to impregnate the said neutral cracking catalyst with said platinum, drying the resulting platinum containing cracking catalyst, calcining the same at a temperature sufficient to drive out the volatilizable nitrogen base by which the normal acidity was neutralized, and subjecting the calcined catalyst to a reduction treatment to reduce the platinum to the metallic state.

4. The method for preparing an acidic supported platinum catalyst which comprises preparing a substantially neutral aqueous solution of tetrammine platinous chloride, soaking in said solution an acidic cracking catalyst the normal acidity of which is neutralized by a base thereby to impregnate the neutral cracking catalyst with said platinum, washing the soaked neutral cracking catalyst to remove uncombined platinum, removing the base by which the acidity of the cracking catalyst was neutralized, and subjecting the resulting acidic catalyst to a reduction treatment to reduce the platinum to the metallic state.

5. The method for preparing an acidic supported platinum catalyst which comprises preparing a substantially neutral aqueous solution of tetrammine platinous chloride, soaking in said solution an acidic cracking catalyst the normal acidity of which is neutralized by a non-volatile alkali thereby to impregnate the neutral cracking catalyst with said platinum, drying the soaked cracking catalyst, subjecting the dried cracking catalyst to a reduction treatment to reduce the platinum to the metallic state, leaching the reduced catalyst with acid to remove the non-volatile alkali with which the normal acidity was neutralized thereby restoring said normal acidity.

6. The method for preparing a supported platinum catalyst which comprises preparing a substantially neutral aqueous solution of tetrammine platinous chloride, soaking in said solution an acidic silica-alumina cracking catalyst the normal acidity of which is neutralized by a base thereby to impregnate the neutralized cracking catalyst with platinum, drying the soaked cracking catalyst, removing the base by which the acidity of the cracking catalyst was neutralized, and subjecting the resulting acidic catalyst to a reduction treatment to reduce the platinum to the metallic state.

7. The method for the production of a supported acidic platinum catalyst which comprises treating an acidic silica-alumina cracking catalyst with a volatilizable nitrogen base to neutralize the acidity of the catalyst, then treating the resulting cracking catalyst with a substantially neutral aqueous solution of tetrammine platinous chloride thereby to impregnate the said cracking catalyst with platinum, drying the resulting platinum-containing cracking catalyst, calcining the same at a temperature sufficient to drive out the volatilizable nitrogen base by which the normal acidity was neutralized, and subjecting the calcined catalyst to a reduction treatment to reduce the platinum to the metallic state.

8. The method for preparing an acidic supported platinum catalyst which comprises preparing a substantially neutral aqueous solution of tetrammine platinous chloride, soaking in said solution an acidic silica-alumina cracking catalyst the normal acidity of which is neutralized by a base thereby to impregnate the neutral cracking catalyst with platinum, washing the soaked cracking catalyst to remove uncombined platinum, removing the base by which the acidity of the cracking catalyst was neutralized, and subjecting the resulting acidic catalyst to a reduction treatment to reduce the platinum to the metallic state.

9. The method for preparing an acidic supported platinum catalyst which comprises preparing a substantially neutral aqueous solution of tetrammine platinous chloride, soaking in said solution an acidic silica-alumina cracking catalyst the normal acidity of which is neutralized by a non-volatile alkali thereby to impregnate the cracking catalyst with platinum, drying the soaked cracking catalyst, subjecting the dried cracking catalyst to a reduction treatment to reduce the platinum to a metallic state, and leaching the reduced catalyst with acid to remove non-volatile alkali with which the normal acidity was neutralized thereby restoring said normal acidity.

References Cited in the file of this patent

UNITED STATES PATENTS

| | | |
|---|---|---|
| 1,916,902 | Wilbur | July 4, 1933 |
| 2,283,172 | Bates | May 19, 1942 |
| 2,329,307 | Thomas et al. | Sept. 14, 1943 |
| 2,550,531 | Ciapetta | Apr. 24, 1951 |
| 2,623,860 | Haensel | Dec. 30, 1952 |
| 2,635,080 | Appell | Apr. 14, 1953 |

OTHER REFERENCES

"Advances in Catalysis," vol. III (1951), p. 213.